(12) United States Patent
Schmidt

(10) Patent No.: US 9,250,879 B2
(45) Date of Patent: Feb. 2, 2016

(54) STRENGTH REDUCTION COMPILER OPTIMIZATIONS

(71) Applicant: International Business Machines Corporation, Armonk, NY (US)

(72) Inventor: William J. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 13/767,146

(22) Filed: Feb. 14, 2013

(65) Prior Publication Data

US 2014/0007063 A1    Jan. 2, 2014

Related U.S. Application Data

(60) Provisional application No. 61/667,109, filed on Jul. 2, 2012.

(51) Int. Cl.
| | | |
|---|---|---|
| G06F 9/45 | (2006.01) | |
| G06F 9/30 | (2006.01) | |
| G06F 9/44 | (2006.01) | |
| G06F 9/455 | (2006.01) | |

(52) U.S. Cl.
CPC ............... *G06F 8/4441* (2013.01); *G06F 8/37* (2013.01); *G06F 8/41* (2013.01); *G06F 8/433* (2013.01); *G06F 8/443* (2013.01); *G06F 9/30145* (2013.01); *G06F 9/44* (2013.01); *G06F 9/45516* (2013.01)

(58) Field of Classification Search
None
See application file for complete search history.

(56) References Cited

U.S. PATENT DOCUMENTS

| | | | |
|---|---|---|---|
| 5,577,253 A | 11/1996 | Blickstein | |
| 5,584,027 A | 12/1996 | Smith | |
| 5,613,117 A | 3/1997 | Davidson et al. | |
| 5,659,753 A | 8/1997 | Murphy et al. | |
| 5,704,053 A | 12/1997 | Santhanam | |
| 5,836,014 A | 11/1998 | Faiman, Jr. | |
| 6,249,910 B1 | 6/2001 | Ju et al. | |
| 6,253,373 B1 | 6/2001 | Peri | |
| 6,286,135 B1 | 9/2001 | Santhanam | |
| 6,507,947 B1 * | 1/2003 | Schreiber et al. ............. | 717/160 |
| 6,986,130 B1 | 1/2006 | Boucher | |
| 7,234,136 B2 | 6/2007 | Tirumalai et al. | |
| 7,257,810 B2 | 8/2007 | Tirumalai et al. | |
| 7,702,856 B2 | 4/2010 | Krishnaiyer et al. | |
| 7,996,825 B2 | 8/2011 | Chakrabarti et al. | |
| 8,453,135 B2 | 5/2013 | Zaafrani | |

(Continued)

OTHER PUBLICATIONS

Bernstein "Multiplication by Integer Constants", 1986, Journal Software—Practice & Experience, vol. 16 issue 7, pp. 641-652.*

(Continued)

*Primary Examiner* — Jason Mitchell
(74) *Attorney, Agent, or Firm* — Martin & Associates, LLC; Derek P. Martin

(57) ABSTRACT

An optimizing compiler includes a strength reduction mechanism that optimizes a computer program that includes conditional operations by analyzing the instructions in the computer program in a single pass, determining whether instruction substitution is profitable for original instructions in the code, and performing instruction substitution for one or more original instructions for which instruction substitution is deemed profitable, including conditional operations. The substituted instructions result in strength reduction in the computer program.

1 Claim, 18 Drawing Sheets

(56) References Cited

U.S. PATENT DOCUMENTS

| | | | |
|---|---|---|---|
| 2003/0056083 | A1 | 3/2003 | Bates et al. |
| 2003/0079209 | A1 | 4/2003 | Sinha |
| 2003/0088863 | A1 | 5/2003 | Tirumalai et al. |
| 2003/0088864 | A1 | 5/2003 | Tirumalai et al. |
| 2003/0237079 | A1 | 12/2003 | Aggarwal et al. |
| 2004/0098710 | A1 | 5/2004 | Radigan |
| 2005/0149915 | A1 | 7/2005 | Wu et al. |
| 2006/0048103 | A1 | 3/2006 | Archambault et al. |
| 2007/0143746 | A1 | 6/2007 | Metzger et al. |
| 2007/0277162 | A1 | 11/2007 | Tanaka et al. |
| 2008/0028380 | A1 | 1/2008 | Guo et al. |
| 2009/0113403 | A1 | 4/2009 | Davis et al. |
| 2009/0125894 | A1* | 5/2009 | Nair et al. .................. 717/156 |
| 2009/0307674 | A1 | 12/2009 | Ng et al. |
| 2010/0095285 | A1 | 4/2010 | Gschwind |
| 2010/0162220 | A1 | 6/2010 | Cui et al. |
| 2011/0231830 | A1 | 9/2011 | Udayakumaran et al. |
| 2013/0055225 | A1 | 2/2013 | Ravi et al. |

OTHER PUBLICATIONS

Cooper et al. "Operator Strength Reduction", 2001, ACM Transactions on Programming Languages and Systems, vol. 23, issue 5.*

Bugzilla webpage printout, "Straight line strength reduction", http://gcc.gnu.org/bugzilla/show_bug.cgi?id=35308, last comment dated Jun. 28, 2012, printed Jan. 9, 2013.

Hailperin, Max, "Cost-Optimal Code Motion", http://gustavus.edu/+max/tcm.pdf, May 1998.

Lengauer et al., "A Fast Algorithm for Finding Dominators in a Flowgraph", ACM Transactions on Programming Languages and Systems, vol. 1, No. 1, Jul. 1979.

Aho, Alfred V.; Sethi, Ravi; and Ullman, Jeffery D., "Compilers: Principles, Techniques, and Tools" c.1986 Reprinted Mar. 1988 Addison-Wesley pp. 585-604.

Richard L. Sites, The Compilation of Loop Induction Expressions, [Online]1979, ACM Trans. Program. Lang. Syst. 1, 1 (Jan. 1979), [Retrieved from the Internet] <http://doi.acm.org/1 0.1145/357062. 357065> pp. 50-57.

Luk et al., Profile-guided post-link stride prefetching, [Online] 2002 In Proceedings of the 16th international conference on Supercomputing (ICS '02). ACM, New York, NY, USA, [Retrieved from the Internet]<http://doi.acm.rg/10.1145/514191.514217> pp. 167-178.

Qing Yi, Applying data copy to improve memory performance of general array computations, [Online]2005, In Proceedings of the 18th international conference on Languages and Compilers for Parallel Computing (LCPC'05), [Retrieved from the Internet] <http://dx.doi.org/10.1007/978-3-540-69330-7_7> pp. 91-105.

Martin et al., CIS 501 Introduction to Computer Architecture, Unit 7: Multiple Issue and Static Scheduling, [Online] Fall 2011, University of Pennsylvania, [Retrieved from the Internet] <https://www.cis.upenn.edu/-milom/cis501-Fall11/> 23 pages.

Bacon et al., Compiler Transformations for High-Performance Computing, ACM Computing Surveys, vol. 26, No. 4, Dec. 1994, pp. 345-420.

Richardson et al., Interprocedural Optimization: Experimental results, Software: Practice and Experience, vol. 19(s), Feb. 1989, pp. 149-169.

Yeom et al., Runtime Support for Optimizing Strided Data Accesses on Multi-Cores with Explicitly Managed Memories, 2010 ACM/IEEE International Conference for High Performance Computing, Networking, Storage and Analysis, Nov. 2010, pp. 1-11.

* cited by examiner

```
double x, a[100];
. . .
for (j = 0; j < 100; j++)
    x += a[j];
```

FIG. 2

```
double x, a[100], *aa;
. . .
for (aa = &a[0]; aa < &a[100]; aa+8)
    x += *aa;
```

| Stmt | Num | Base(B) | Index(i) | Stride(S) | Kind | Next Interp | Basis | Dep | Sib | Dead Savings |
|---|---|---|---|---|---|---|---|---|---|---|
| a=5*s | 1 | s | 0 | 5 | MULT | 0 | 0 | 0 | 0 | 0 |

FIG. 12

| Stmt | Num | Base(B) | Index(i) | Stride(S) | Kind | Next Interp | Basis | Dep | Sib | Dead Savings |
|---|---|---|---|---|---|---|---|---|---|---|
| a=5*s | 1 | s | 0 | 5 | MULT | 0 | 0 | 0 | 0 | 0 |
| b=x+a | 2 | x | 5 | s | ADD | 3 | 0 | 0 | 0 | C(*,5) |
| b=x+a | 3 | a | 1 | x | ADD | 0 | 0 | 0 | 0 | 0 |

FIG. 13

| Stmt | Num | Base(B) | Index(i) | Stride(S) | Kind | Next Interp | Basis | Dep | Sib | Dead Savings |
|---|---|---|---|---|---|---|---|---|---|---|
| a=5*s | 1 | s | 0 | 5 | MULT | 0 | 0 | 0 | 0 | 0 |
| b=x+a | 2 | x | 5 | s | ADD | 3 | 0 | 0 | 0 | C(*,5) |
| b=x+a | 3 | a | 1 | x | ADD | 0 | 0 | 0 | 0 | 0 |
| c=7*s | 4 | s | 0 | 7 | MULT | 0 | 0 | 0 | 0 | 0 |

FIG. 14

| Stmt | Num | Base(B) | Index(i) | Stride(S) | Kind | Next Interp | Basis | Dep | Sib | Dead Savings |
|---|---|---|---|---|---|---|---|---|---|---|
| a=5*s | 1 | s | 0 | 5 | MULT | 0 | 0 | 0 | 0 | 0 |
| b=x+a | 2 | x | 5 | s | ADD | 3 | 0 | 5 | 0 | C(*,5) |
| b=x+a | 3 | a | 1 | x | ADD | 0 | 0 | 0 | 0 | 0 |
| c=7*s | 4 | s | 0 | 7 | MULT | 0 | 0 | 0 | 0 | 0 |
| d=x+c | 5 | x | 7 | s | ADD | 6 | 2 | 0 | 0 | C(*,7) |
| d=x+c | 6 | c | 1 | x | ADD | 0 | 0 | 0 | 0 | 0 |

FIG. 15

| Stmt | Num | Base(B) | Index(i) | Stride(S) | Kind | Next Interp | Basis | Dep | Sib | Dead Savings |
|---|---|---|---|---|---|---|---|---|---|---|
| a=5*s | 1 | s | 0 | 5 | MULT | 0 | 0 | 0 | 0 | 0 |
| b=x+a | 2 | x | 5 | s | ADD | 3 | 0 | 5 | 0 | C(*,5) |
| b=x+a | 3 | a | 1 | x | ADD | 0 | 0 | 0 | 0 | 0 |
| c=7*s | 4 | s | 0 | 7 | MULT | 0 | 0 | 0 | 0 | 0 |
| d=x+c | 5 | x | 7 | s | ADD | 6 | 2 | 0 | 0 | C(*,7) |
| d=x+c | 6 | c | 1 | x | ADD | 0 | 0 | 0 | 0 | 0 |
| g=9*s | 7 | s | 0 | 9 | MULT | 0 | 0 | 0 | 0 | 0 |

FIG. 16

| Stmt | Num | Base(B) | Index(i) | Stride(S) | Kind | Next Interp | Basis | Dep | Sib | Dead Savings |
|---|---|---|---|---|---|---|---|---|---|---|
| a=5*s | 1 | s | 0 | 5 | MULT | 0 | 0 | 0 | 0 | 0 |
| b=x+a | 2 | x | 5 | s | ADD | 3 | 0 | 5 | 0 | C(*,5) |
| b=x+a | 3 | a | 1 | x | ADD | 0 | 0 | 0 | 0 | 0 |
| c=7*s | 4 | s | 0 | 7 | MULT | 0 | 0 | 0 | 0 | 0 |
| d=x+c | 5 | x | 7 | s | ADD | 6 | 2 | 8 | 0 | C(*,7) |
| d=x+c | 6 | c | 1 | x | ADD | 0 | 0 | 0 | 0 | 0 |
| g=9*s | 7 | s | 0 | 9 | MULT | 0 | 0 | 0 | 0 | 0 |
| h=x+g | 8 | x | 9 | s | ADD | 9 | 5 | 0 | 0 | C(*,9) |
| h=x+g | 9 | g | 1 | x | ADD | 0 | 0 | 0 | 0 | 0 |

FIG. 17

| Stmt | Num | Base(B) | Index(i) | Stride(S) | Kind | Next Interp | Basis | Dep | Sib | Dead Savings |
|---|---|---|---|---|---|---|---|---|---|---|
| a=5*s | 1 | s | 0 | 5 | MULT | 0 | 0 | 0 | 0 | 0 |
| b=x+a | 2 | x | 5 | s | ADD | 3 | 0 | 5 | 0 | C(*,5) |
| b=x+a | 3 | a | 1 | x | ADD | 0 | 0 | 0 | 0 | 0 |
| c=7*s | 4 | s | 0 | 7 | MULT | 0 | 0 | 0 | 0 | 0 |
| d=x+c | 5 | x | 7 | s | ADD | 6 | 2 | 8 | 0 | C(*,7) |
| d=x+c | 6 | c | 1 | x | ADD | 0 | 0 | 0 | 0 | 0 |
| g=9*s | 7 | s | 0 | 9 | MULT | 0 | 0 | 0 | 0 | 0 |
| h=x+g | 8 | x | 9 | s | ADD | 9 | 5 | 0 | 0 | C(*,9) |
| h=x+g | 9 | g | 1 | x | ADD | 0 | 0 | 0 | 0 | 0 |
| e=8*s | 10 | s | 0 | 8 | MULT | 0 | 0 | 0 | 0 | 0 |

FIG. 18

| Stmt | Num | Base(B) | Index(i) | Stride(S) | Kind | Next Interp | Basis | Dep | Sib | Dead Savings |
|---|---|---|---|---|---|---|---|---|---|---|
| a=5*s | 1 | s | 0 | 5 | MULT | 0 | 0 | 0 | 0 | 0 |
| b=x+a | 2 | x | 5 | s | ADD | 3 | 0 | 11 | 0 | C(*,5) |
| b=x+a | 3 | a | 1 | x | ADD | 0 | 0 | 0 | 0 | 0 |
| c=7*s | 4 | s | 0 | 7 | MULT | 0 | 0 | 0 | 0 | 0 |
| d=x+c | 5 | x | 7 | s | ADD | 6 | 2 | 8 | 0 | C(*,7) |
| d=x+c | 6 | c | 1 | x | ADD | 0 | 0 | 0 | 0 | 0 |
| g=9*s | 7 | s | 0 | 9 | MULT | 0 | 0 | 0 | 0 | 0 |
| h=x+g | 8 | x | 9 | s | ADD | 9 | 5 | 0 | 0 | C(*,9) |
| h=x+g | 9 | g | 1 | x | ADD | 0 | 0 | 0 | 0 | 0 |
| e=8*s | 10 | s | 0 | 8 | MULT | 0 | 0 | 0 | 0 | 0 |
| f=x+e | 11 | x | 8 | s | ADD | 12 | 2 | 0 | 5 | C(*,8) |
| f=x+e | 12 | e | 1 | x | ADD | 0 | 0 | 0 | 0 | 0 |

FIG. 19

| Increment | Count | Cost | Initializer |
|---|---|---|---|
| 5 | 0 | ∞ | a |
| 3 | 1 | C(*,3)-C(*,8) | - |
| 2 | 2 | C(*,2)-C(*,7)-C(*,9) | - |

FIG. 20

| C(*,2) | C(*,3) | C(*,7) | C(*,8) | C(*,9) |
|---|---|---|---|---|
| y = x << 1 | t = x << 1<br>y = t + x | t = x << 3<br>y = t - x | t = x << 3 | t = x << 3<br>y = t + x |

FIG. 21

```
a = (x + i) * 4;
if (...)
        i = i + 1;
else
        i = i + 2;
b = (x + i) * 4;
```

FIG. 23

```
a = (x + i) * 4;
if (...)
        t = a + 4;
else
        t = a + 8;
b = t;
```

FIG. 24

| Stmt | Num | Base(B) | Index(i) | Stride(S) | Kind | Next Interp | Basis | Dep | Sib | Dead Savings | Phi |
|---|---|---|---|---|---|---|---|---|---|---|---|
| $a_0=5*x_0$ | 1 | $x_0$ | 0 | 5 | MULT | 0 | 0 | 0 | 0 | 0 | 0 |

FIG. 27

| Stmt | Num | Base(B) | Index(i) | Stride(S) | Kind | Next Interp | Basis | Dep | Sib | Dead Savings | Phi |
|---|---|---|---|---|---|---|---|---|---|---|---|
| $a_0=5*x_0$ | 1 | $x_0$ | 0 | 5 | MULT | 0 | 0 | 0 | 0 | 0 | 0 |
| $x_1=x_0+1$ | 2 | $x_0$ | 1 | 1 | ADD | 0 | 0 | 0 | 0 | 0 | 0 |

FIG. 28

| Stmt | Num | Base(B) | Index(i) | Stride(S) | Kind | Next Interp | Basis | Dep | Sib | Dead Savings | Phi |
|---|---|---|---|---|---|---|---|---|---|---|---|
| $a_0=5*x_0$ | 1 | $x_0$ | 0 | 5 | MULT | 0 | 0 | 0 | 0 | 0 | 0 |
| $x_1=x_0+1$ | 2 | $x_0$ | 1 | 1 | ADD | 0 | 0 | 0 | 0 | 0 | 0 |
| $x_2=\Phi(x_0,x_1)$ | 3 | $x_0$ | 0 | 1 | PHI | 0 | 0 | 0 | 0 | C(+) | 0 |

FIG. 29

| Stmt | Num | Base(B) | Index(i) | Stride(S) | Kind | Next Interp | Basis | Dep | Sib | Dead Savings | Phi |
|---|---|---|---|---|---|---|---|---|---|---|---|
| $a_0=5*x_0$ | 1 | $x_0$ | 0 | 5 | MULT | 0 | 0 | 0 | 0 | 0 | 0 |
| $x_1=x_0+1$ | 2 | $x_0$ | 1 | 1 | ADD | 0 | 0 | 0 | 0 | 0 | 0 |
| $x_2=\Phi(x_0,x_1)$ | 3 | $x_0$ | 0 | 1 | PHI | 0 | 0 | 0 | 0 | $C(+)$ | 0 |
| $x_3=x_2+1$ | 4 | $x_2$ | 1 | 1 | ADD | 0 | 0 | 0 | 0 | $C(\Phi)+C(+)$ | 0 |

FIG. 30

| Stmt | Num | Base(B) | Index(i) | Stride(S) | Kind | Next Interp | Basis | Dep | Sib | Dead Savings | Phi |
|---|---|---|---|---|---|---|---|---|---|---|---|
| $a_0=5*x_0$ | 1 | $x_0$ | 0 | 5 | MULT | 0 | 0 | 5 | 0 | 0 | 0 |
| $x_1=x_0+1$ | 2 | $x_0$ | 1 | 1 | ADD | 0 | 0 | 0 | 0 | 0 | 0 |
| $x_2=\Phi(x_0,x_1)$ | 3 | $x_0$ | 0 | 1 | PHI | 0 | 0 | 0 | 0 | $C(+)$ | 0 |
| $x_3=x_2+1$ | 4 | $x_2$ | 1 | 1 | ADD | 0 | 1 | 0 | 0 | $C(\Phi)+C(+)$ | 0 |
| $a_1=5*x_3$ | 5 | $x_2$ | 1 | 5 | MULT | 0 | 0 | 0 | 0 | $C(\Phi)+2*C(+)$ | 3 |

FIG. 31

STRENGTH REDUCTION COMPILER OPTIMIZATIONS

BACKGROUND

1. Technical Field

This disclosure generally relates to computer systems, and more specifically relates to compilers that generate executable code for computer systems.

2. Background Art

Computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number and complexity of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the arrangement and type of instructions within the computer program. Many different optimizations have been developed so the code produced by compilers has better run-time performance. One such optimization is known as "strength reduction", which relates to replacing one or more expensive instructions with one or more less-expensive instructions. The most common such optimization is to replace repeated multiplications by repeated additions or subtractions. Indeed, this is often the only form of strength reduction performed by an optimizing compiler, since other related opportunities, such as divisions and modulos, are comparatively infrequent.

BRIEF SUMMARY

An optimizing compiler includes a strength reduction mechanism that optimizes a computer program that includes conditional operations by analyzing the instructions in the computer program in a single pass, determining whether instruction substitution is profitable for original instructions in the code, and performing instruction substitution for one or more original instructions for which instruction substitution is deemed profitable, including conditional operations. The substituted instructions result in strength reduction in the computer program. One detailed method for the strength reduction mechanism includes the steps of traversing the instructions in the computer program in a single pass to build a candidate table, computing the cost of each candidate in the candidate table, and performing instruction substitution of one or more alternative instructions for one or more original instructions that have a cost that indicates instruction substitution is profitable, and therefore results in strength reduction.

The strength reduction mechanism performs strength reduction for many operations, including conditional operations.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a diagram showing a first sample snippet of code;

FIG. 3 is a diagram showing a prior art method for strength reduction for the code shown in FIG. 2;

FIG. 4 is a diagram showing a second sample snippet of code that contains an unknown stride;

FIG. 5 is a diagram showing a strength-reduced snippet of code equivalent to the code in FIG. 4;

FIG. 6 is a diagram showing a third sample snippet of code;

FIG. 7 is a diagram showing an unprofitable strength-reduced snippet of code equivalent to the code shown in FIG. 6;

FIG. 12 is a block diagram of a candidate table after processing the first instruction in block A;

FIG. 13 is block diagram of the candidate table after processing the second instruction in block A;

FIG. 14 is a block diagram of the candidate table after processing the first instruction in block B;

FIG. 15 is a block diagram of the candidate table after processing the second instruction in block B;

FIG. 16 is a block diagram of the candidate table after processing the first instruction in block E;

FIG. 17 is a block diagram of the candidate table after processing the second instruction in block E;

FIG. 18 is a block diagram of the candidate table after processing the first instruction in block C;

FIG. 19 is a block diagram of the candidate table after processing the second instruction in block C;

FIG. 20 is an increment table created from the candidate table shown in FIG. 17;

FIG. 21 is a cost table for the increment table in FIG. 20;

FIG. 23 is a diagram showing a fourth sample snippet of code;

FIG. 24 is a diagram showing a fifth sample snippet of code that results from performing strength reduction on the code in FIG. 23;

FIG. 27 is a block diagram of a candidate table after processing the instruction in block A;

FIG. 28 is block diagram of the candidate table after processing the instruction in block B;

FIG. 29 is a block diagram of the candidate table after processing the first instruction in block C;

FIG. 30 is a block diagram of the candidate table after processing the second instruction in block C;

FIG. 31 is a block diagram of the candidate table after processing the third instruction in block C.

DETAILED DESCRIPTION

Figure 1:
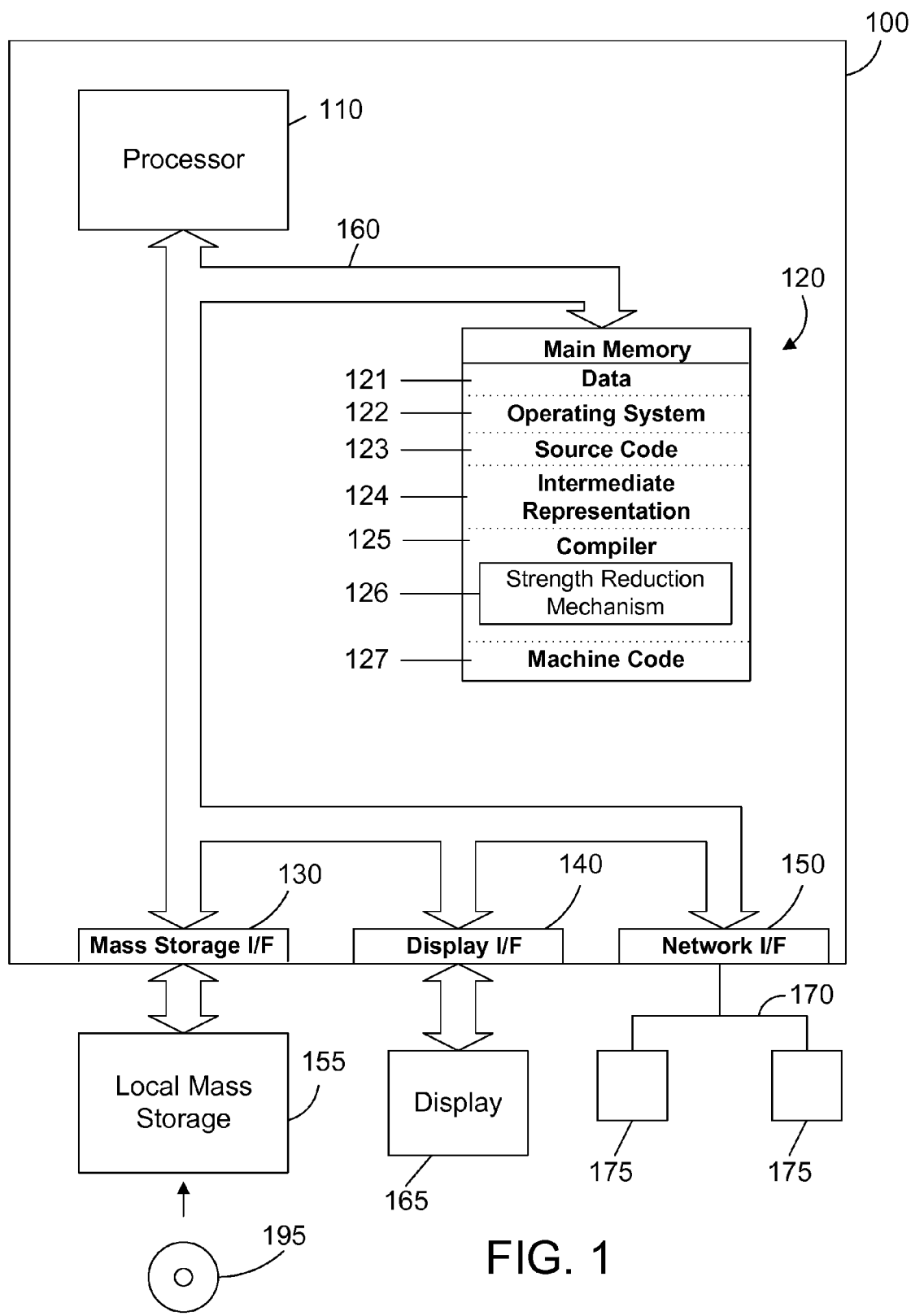
FIG. 1 is a block diagram of an apparatus that includes a strength reduction mechanism in an optimizing compiler.

There are known methods for performing strength reduction on operations with known strides in an optimizing compiler using multiple-pass analysis or loop analysis. To illustrate, consider the C language code snippet in FIG. 2. We assume for this example a double is implemented using eight bytes. The statement x+=a[j] multiples j by the size of the double, namely 8, then adds this to a's address to find the address of the next array element. Thus, the statement x+=a[j] is equivalent to *(&a+(j*8)). The recurring value of 8 is called the "stride" of the operation. Thus, a multiply (or shift) and an add are required in each loop iteration to produce the address of the next array element.

A known optimizing compiler could perform strength reduction by replacing the code in FIG. 2 with the code in FIG. 3. This is possible because the stride, which is 8 in this specific example, is known. Strength reduction is most commonly done in known optimizing compilers for code that includes loops, as shown in FIG. 2.

Known optimizing compilers do not perform strength reduction when the stride is unknown at compile-time. For the simple example above, the term "stride" denotes the distance between an array element and the next (8 in the above example). As used herein, the term "stride" is generalized so any two operations containing multiplications c*s and d*s have a common stride s. The stride may be a constant (known) or a variable (unknown). This disclosure focuses on the case when the stride is unknown, meaning s is a variable and c and d are constants. Because s is a variable, s is unknown at compile-time.

A simple example will illustrate limitations in prior art optimizing compilers. Another sample code snippet is shown in FIG. 4. While the code could be rewritten as shown in FIG. 5, because the stride "s" is unknown at compile-time, known optimizing compilers will not perform strength reduction on the code in FIG. 4. However, the code in FIG. 4 could benefit from the strength reduction shown in FIG. 5. An optimizing compiler will generate efficient code for these statements as follows. a=x+(3*s) will be replaced by a=x+(s<<2)−s; b=x+(5*s) will be replaced by b=x+(s<<2)+s; and c=x+(7*s) will be replaced by c=x+(s<<3)−s. Since the value of s<<2 need only be computed once, the cost of executing the operation comprising the three statements in FIG. 4 is two shifts, four adds, and two subtracts. Note, however, the introduction of a temporary variable can reduce the number of operations and give new opportunities for strength reduction. Such a temporary variable "t" is shown in FIG. 5. The first statement a=x+(3*s) can be replaced by a=x+(s<<1)+1. The second statement t=s*2 requires one shift, which can reuse s<<1 from the first instruction. The statements b=a+t and c=b+t require only one add each. The code in FIG. 5 is thus equivalent to the code in FIG. 4, yet only uses 1 shift and 4 adds, five total steps, while the code in FIG. 5 uses two shifts, four adds, and two subtracts, eight total steps. The code in FIG. 5 thus result in a savings of 37.5%, which would yield increased performance compared to the code in FIG. 4. However, because the stride "s" is unknown at compile-time, prior art optimizing compilers would not perform any strength reduction on the code shown in FIG. 4. This simple example illustrates shortcomings in known optimizing compilers, which do not perform strength reduction when the stride is unknown.

Figures 6, 7:
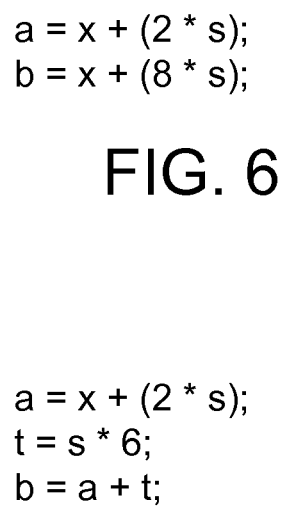

Another example is shown in FIGS. 6 and 7 to show that adding a temporary variable does not necessarily result in a reduction of operations. The code in FIG. 6 can be implemented using two shifts and two adds. The code in FIG. 7, after introduction of the temporary variable t, results in three shifts and two adds. Because the introduction of the temporary variable t does not improve performance, an optimizing compiler needs to take into account cost of the code with the temporary variable compared to cost of the original code. The optimizing compiler disclosed herein includes a strength reduction mechanism that analyzes a computer program in a single pass and computes cost of the original code and cost of the new code to determine when instruction substitution may be performed in a manner that produces strength reduction.

The claims and disclosure herein provide an optimizing compiler with a strength reduction mechanism that performs a single pass analysis of the computer program followed by determining where instruction substitution is profitable. When profitable, the instruction substitution is performed, including operations with unknown strides and conditional operations, resulting in strength reduction in the computer program.

Referring to FIG. 1, a computer system 100 is one suitable implementation of a server computer system that includes an optimizing compiler with a strength reduction mechanism that performs strength reduction for operations with strides that are not known at compile-time and for conditional operations. Server computer system 100 is an IBM zEnterprise System computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, source code 123, an intermediate representation 124, a compiler 125, and machine code 127. Data 121 represents any data that serves as input to or output from any program in computer system 100. Operating system 122 is a multitasking operating system. There are three different representations of a computer program in FIG. 1, namely the high-level source code 123, the intermediate representation 124 that is generated by a front-end compiler from the source code 123, and the machine code 127 that is generated by a back-end compiler from the intermediate representation 124. The compiler 125 is preferably an optimizing back-end compiler that compiles the intermediate representation 124 and generates the machine code 127. Compiler 125 may also be used to generate the intermediate representation 124 from the source code 123, or this may be done using a different compiler. The compiler 125 includes a strength reduction mechanism 126 that analyzes the computer program in a single pass, and makes one or more instruction substitutions to improve the performance of the computer program, even when the stride is unknown at compile-time or for conditional operations. In the examples herein, the compiler 125 operates on the intermediate representation 124 of the computer program. However, the compiler 125 could also operate on the source code 123 as well.

Note the source code 123, intermediate representation 124, compiler 125, and machine code 127 are all shown residing in memory 120 for the convenience of showing all of these elements in one drawing. One skilled in the art will appreciate that this is not the normal mode of operation for most compilers. A front-end compiler processes source code 123 and generates therefrom intermediate representation 124. This processing may occur on a computer system separate from computer system 100. Compiler 125 processes intermediate representation 124 and generates therefrom machine code 127, which may also occur on a separate computer system. In the extreme, source code 123 could reside on a first computer system and a front-end compiler could reside on a second computer system. The front-end compiler could read the source code 123 from the first computer system, generate the intermediate representation 124, and store the intermediate representation 124 on a third computer system. Compiler 125 could be executed on a fourth computer system, which reads the intermediate representation 124 from the third computer system, and generates therefrom machine code 127, which could be written to a fifth computer system. This simple example shows that the preferred embodiments expressly extend to any suitable configuration and number of computer systems to accomplish the front-end and back-end compiling. The "apparatus" described herein and in the claims expressly extends to a multiple computer configuration, as described by the example above.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, source code 123, intermediate representation 124, compiler 125, and machine code 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the compiler 125.

Although computer system 100 is shown to contain only a single processor and a single system bus, those skilled in the art will appreciate that an optimizing compiler as taught herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
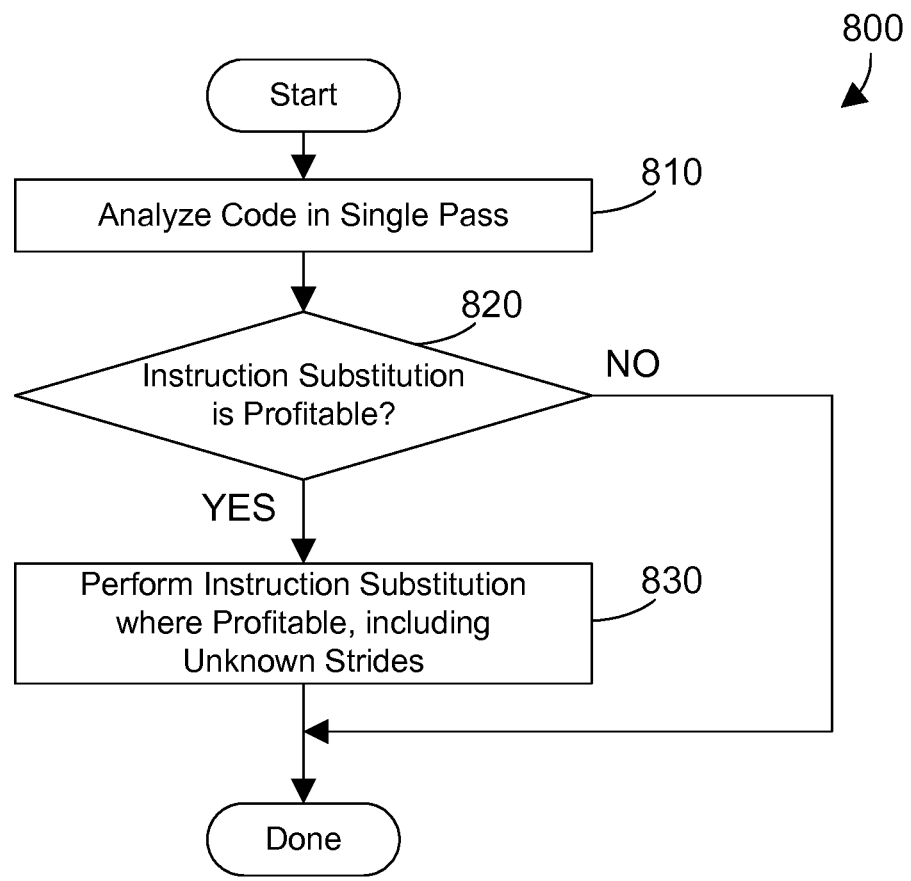
FIG. 8 is a flow diagram of a method for performing strength reduction in a single pass for unknown strides.

Referring to FIG. 8, a method 800 performs analysis of code in a single pass and performs instruction substitution when profitable, resulting in strength reduction in the code. Method 800 is preferably performed by the strength reduction mechanism 126 shown in FIG. 1. The code is analyzed (step 810). When instruction substitution is profitable (step 820=YES), instruction substitution is performed where profitable, including operations of unknown strides (step 830). The term "unknown strides" is used herein to mean a stride that is unknown at compile-time. As discussed above, prior art optimizing compilers do not perform strength reduction for operations with unknown strides. Method 800, in contrast, performs strength reduction for operations with unknown strides as well as for operations with known strides.

Figure 9:
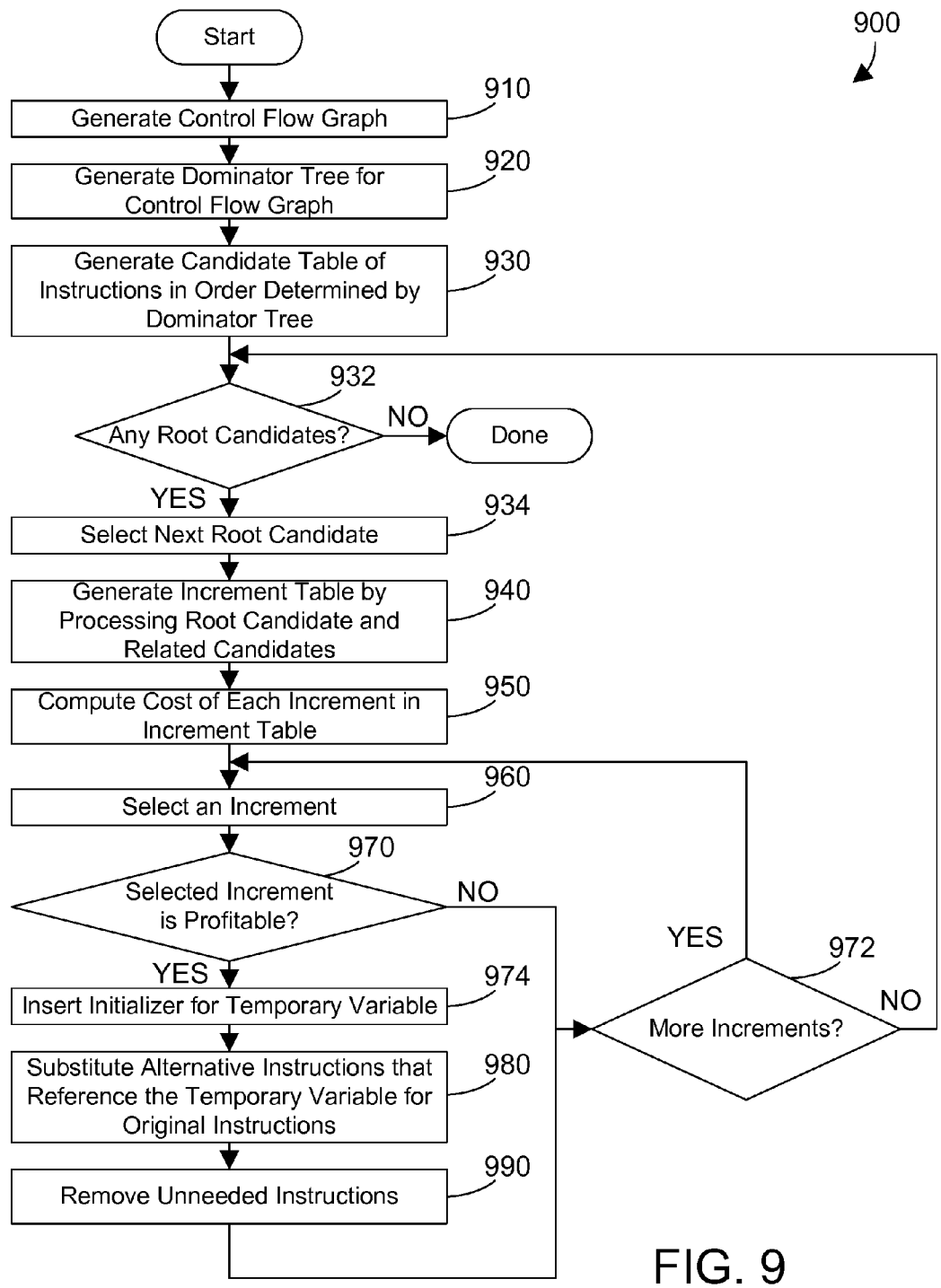
FIG. 9 is a flow diagram of a method showing one suitable implementation for method 800 in FIG. 8.

Referring to FIG. 9, method 900 is one specific implementation for method 800 in FIG. 8. Method 900 is also preferably performed by the strength reduction mechanism 126 in FIG. 1. First, a control flow graph is generated (step 910). A dominator tree is generated for the control flow graph (step 920). A candidate table of instructions is then generated, where the instructions in the candidate table will be in an order determined by the dominator tree (step 930). One or more increment tables are then generated from the candidate table. When a root candidate exists in the candidate table (step 932=YES), the next root candidate is selected (step 934). An increment table is then generated by processing the root candidate and related candidates from the candidate table (step 940). The cost of each increment in the increment table is computed (step 950). One of the increments in the increment table is selected (step 960). When the selected increment is not profitable (step 970=NO), and there are more increments in the increment table to process (step 972=YES), method 900 loops back to step 960 and continues. When a selected increment is profitable (step 970=YES), an initializer instruction for a temporary variable is inserted into the code (step 974), one or more alternative instructions that reference the temporary variable are substituted for one or more original instructions (step 980), and any unneeded instructions are removed (step 990). Instructions may be unneeded due to the substitution of the alternative instructions for the original instructions in step 980. When there are more increments in the increment table to process (step 972=YES), method 900 loops back to step 960 and continues. When there are no more increments in the increment table to process (step 972=NO), method 900 loops back to step 932 and continues until all root candidates in the candidate table have been processed (step 932=NO). At this point, method 900 is done.

Figure 10:
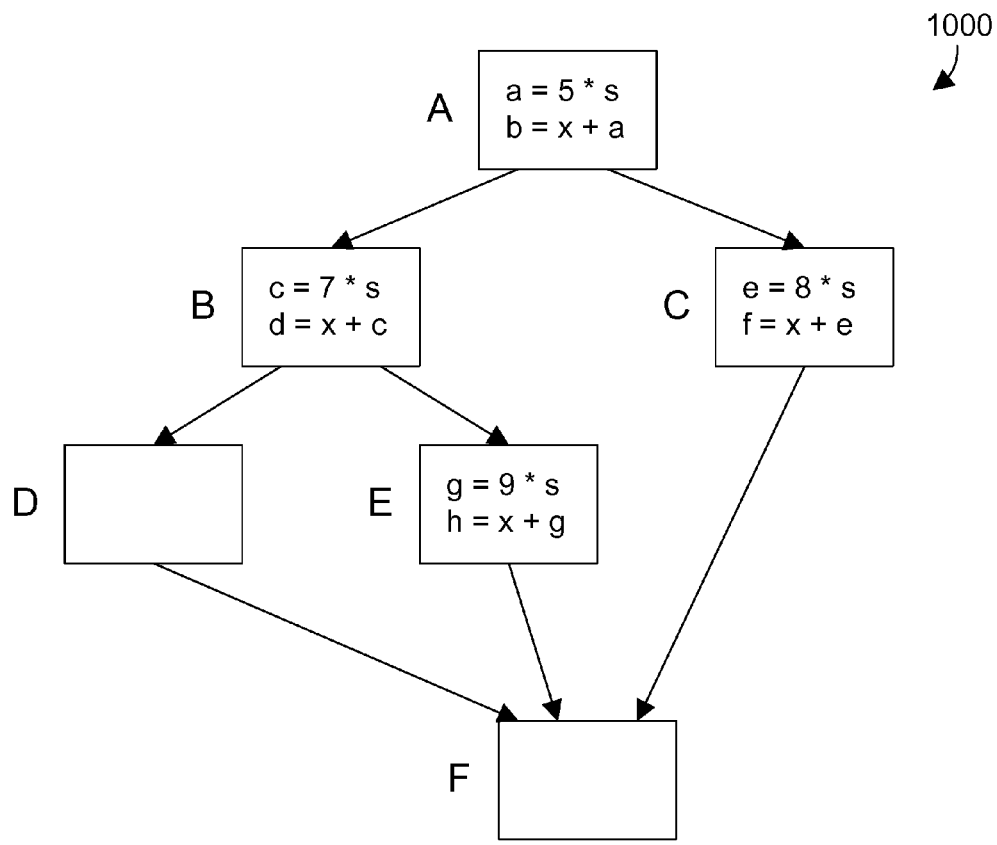
FIG. 10 is a diagram of a portion of a control flow graph of sample code.

The steps in FIG. 9 are now illustrated using the specific example shown in FIGS. 10-22. Step 910 in FIG. 9 generates a control flow graph. Referring to FIG. 10, a control flow graph 1000 is shown that is representative of a portion of a computer program. Control flow graphs are well-known in the art, and the various methods for constructing a control flow graph are also known. Note the sample instructions shown in FIG. 10 are extremely simplified for the purpose of illustrating the concepts herein. In particular, many unrelated instructions, including branch instructions, have been omitted. The control flow graph 1000 indicates that after executing the second instruction in basic block A, the program branches to either basic block B or basic block C. Similarly, after executing the second instruction in basic block B, the program branches to either basic block D or basic block E. The arrows in the control flow graph represent possible flows between basic blocks.

Figure 11:
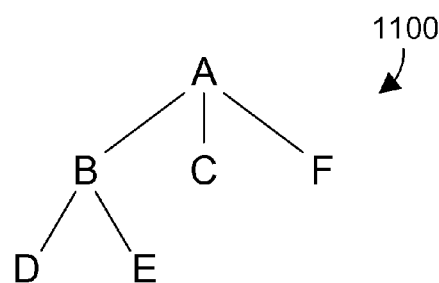
FIG. 11 is a diagram of a dominator tree for the code shown in FIG. 10.

Many known optimizing compilers use control flow graphs similar to that shown in FIG. 10, but require multiple passes of analysis to perform strength reduction, or only perform strength reduction on loop induction variables. The disclosure and claims herein are directed to an apparatus, method and program product that include a strength reduction mechanism that performs a single pass analysis of a control flow graph, and that can operate on operations of unknown strides as well as operations of known strides. In step 920 in FIG. 9, a dominator tree is constructed. For the control flow graph in FIG. 10, the dominator tree 1100 is shown in FIG. 11. A dominator tree may be constructed according to the concept of "dominance" in a control flow graph. Block A is said to "dominate" block B, denoted "A dom B", if every path from the beginning of the procedure to B must pass through A. Thus, A is always executed at least once before B is reached the first time. A is said to be the unique "immediate dominator" of B, denoted "A idom B", provided that A dom B and there does not exist a block C such that A dom C and C dom B. The immediate dominator relation induces a tree on the nodes of the control flow graph where the edge A->B exists in the tree if and only if A idom B. Every node in the control flow graph has an immediate dominator, so the dominator tree 1100 in FIG. 11 completely covers the nodes of the control flow graph 1000 in FIG. 10. Thus, a topological walk of the tree in a single forward pass visits each basic block only after all of its dominators have been visited.

With the above description of dominance in a control flow graph, the dominator tree 1100 in FIG. 11 may be constructed from the control flow graph 1000 in FIG. 10. Dominator tree 1100 shows that block A is the immediate dominator of blocks B, C, and F, and block B is the immediate dominator of blocks D and E. A dominates every block in the graph, while blocks C, D, and E do not dominate any other blocks. Construction of the dominator tree 1100 is well known in the art, as shown in Lengauer et al., "A Fast Algorithm for Finding Dominators in a Flowgraph", ACM Transactions on Programming Languages and Systems, Vol. 1, No. 1, pp. 121-141, July 1979.

The instructions in the control flow graph are analyzed in an order determined by the dominator tree, and instructions that may be candidates for strength reduction are placed into a candidate table. The basic blocks in the control flow graph may be visited in any order that respects the dominance ordering represented in the dominator tree, which means a block is never visited prior to its immediate dominator. Two such orderings for the dominator tree 1100 in FIG. 11 are ABDECF and ABCFDE. We will use ABDECF in this example. Within each block, statements are visited in forward order. Assume that x and s are variables that are input to the program.

A candidate table may then be generated as shown in step 930 in FIG. 9. The candidate table is built one instruction at a time, and includes the instructions in the program being analyzed. Referring to FIG. 12, the candidate table is shown after analyzing the first candidate instruction in basic block A, namely a=5*s. The candidate table shown in FIGS. 12-19 include columns labeled Stmt, Num, Base (B), Index (i), Stride (S), Kind, Next Interp, Basis, Dep, Sib and Dead Savings. These columns (or fields) of the candidate table shown in FIGS. 12-19 are described in more detail below with reference to the specific control flow graph in FIG. 10. Note the expression C(*, 5) shown in the Dead Savings field of the second row in FIG. 13 is shorthand for "the cost of multiplying a variable by the constant 5." The discussion below explains how the candidate table is populated one instruction at a time.

When each candidate instruction or statement is visited, a set of rules are used to determine whether the statement refers to an expression of the form (B+i)*S, referred to here as a MULT, or of the form B+(i*S), referred to here as an ADD. B and S must be variables, and i must be a constant. For example, the right-hand side of the first statement a=5*s can be written as (s+0)*5, with B=s, i=0, and S=5.

We assume that the program is in static single-assignment form, so that each variable appears on the left-hand side of, i.e., is defined by, at most, one statement. When encountering a variable V on the right-hand side of a statement S whose definition already appears in the table, the known values of B, i, and S for variable V are factored into the entry for statement S. So for statement 2(b=x+a), we combine b=x+a with a=5*s to get the expression x+(5*s), with B=x, i=5, and S=s. There may be many rules for combining various statements, which are not all described here.

If, in the foregoing discussion, the variable V has no other uses than the one in statement S, the possibility exists that we will be able to remove the statement that defines V in a subsequent optimization. To ease later analysis, we record the cost of computing V in the "Dead Savings" field of S. For statement 2 in FIG. 13, this is the cost of multiplying s by the constant 5. The cost is estimated based on the characteristics of the target processor, and may be measured in any useful units, such as instructions or CPU cycles. Dead-code savings is cumulative, so if the candidate entry that defines V has a nonzero cost in its Dead Savings field, that is added into C's Dead Savings field. Note that b=x+a has two variables on the right-hand side. There are two ways of interpreting this: either B=x, or B=a. That is, we can consider the right-hand side to be x+(5*s), or a+(1*x). In the latter case, x is a program input, so it does not have a candidate entry in the table. When there are multiple interpretations for a statement, each interpretation gets a separate entry in the candidate table, and they are linked together in a chain using the Next Interp field as described in detail below.

Whenever an ADD candidate C is placed in the table, we check whether any previous entries in the table can be used as a basis for C. A previous ADD candidate P can serve as a basis for C if P and C have identical Base and Stride fields, and if P dominates C. Because we are processing blocks using an ordering that respects dominance, all statements that can dominate C are already in the candidate table.

Note that C may have more than one basis in the table. In this case, any policy may be used to select one of these as C's basis. In this example, we choose the basis that appears latest in the table, which is the "most immediately dominating basis", but several other policies could also be used within the scope of the disclosure and claims herein.

If P is a basis for C, the reverse relationship is stated as "C is a dependent of P." Thus when a basis P is found for C, P's candidate number is recorded in C's Basis field, and C's candidate number is recorded in P's Dependent field. If P already had a nonzero Dependent field (because another candidate uses P as a basis), the previous value of P's Dependent field is stored in C's Sibling field. Thus all dependents of P can be found by recursively following the Dependent and Sibling fields of P's immediate dependent. With all this in mind, we can see how the candidate table is created. As previously discussed, a=5*s is given a MULT entry in the table with B=s, i=0, and S=5. It has only one variable on the right-hand side, so it does not have an alternate interpretation. Since it is not an ADD, all remaining fields are zero, as shown in FIG. 12.

The next candidate instruction b=x+a is given two ADD entries for x+(5*s) and a+(1*x). There is no previous entry with B=x and S=s, so the first interpretation does not have a basis. There is no previous entry with B=a and S=x, so the second interpretation does not have a basis. Initially the Dependent and Sibling fields for both are set to zero. Because the first interpretation relies on the previous candidate a=5*s, and a does not have any other uses in the program, we place C(*, 5) in the Dead Savings field, as shown in FIG. 13.

Candidate 4 (c=7*s) is processed exactly like candidate 1, which results in the candidate table shown in FIG. 14.

Candidates 5 and 6 (d=x+c) are processed similarly to instructions 2 and 3. This time, however, candidate 5 has a basis in candidate 2, because both candidates have B=x and S=s, and statement 2 dominates statement 5 (block A dominates block B). So candidate 5's Basis field is set to 2, and candidate 2's Dependent field is set to 5, as shown by the bold 5 in the Dep field of candidate 2 in FIG. 13. Since it was previously 0, no Sibling processing is necessary. The resulting candidate table is shown in FIG. 15.

Candidate 7 (g=9*s) is processed exactly like candidates 1 and 4, resulting in the candidate table shown in FIG. 16.

Candidates 8 and 9 (h=x+g) are processed similarly to candidates 5 and 6. This time candidate 8 has two possible bases in candidates 2 and 5. Since the selected policy is to choose the most immediate dominating basis, candidate 5 is chosen as the basis. Candidate 8's Basis field is set to 5, and candidate 5's Dependent field is set to 8, as shown in bold in FIG. 17. Since it was previously 0, again no Sibling processing is necessary. The resulting candidate table is shown in FIG. 17.

Candidate 10 (e=8*s) is processed exactly like candidates 1, 4, and 7, resulting in the candidate table shown in FIG. 18.

Candidates 11 and 12 (f=x+e) are processed similarly to candidates 2 and 3. This time candidate 11 has only one basis which is candidate 2. Candidate 11's Basis field is set to 2, and candidate 2's Dependent field is set to 11, as shown in bold in FIG. 19. However, since candidate 2's Dependent field was previously 5, now candidate 11's Sibling field is set to 5 so this dependency is not lost. The result is the candidate table shown in FIG. 19, which includes all candidates from the control flow graph 1000 in FIG. 10.

Next, each set of related candidates in the candidate table is identified, analyzed, and optimized as a group. Two candidates are "related" if a transitive walk of their Basis fields reaches the same "root" candidate. A root is a candidate that has no basis (Basis=0) and has at least one dependent (Dependent≠0). The candidate table in FIG. 19 is scanned from the top down to find the first such root candidate. Then every related candidate in the tree is processed recursively via the Sibling and Dependent links to form an increment table for the set of related candidates, as described below. Note that there is a separate increment table for each set of related candidates.

FIG. 20 shows such an increment table. The Increment field contains a value by which at least one candidate's index field differs from the index field of its basis. The Count field indicates how many replaceable candidates have this increment. If not zero, the Initializer field identifies an existing variable that represents the expression I*S, where I is the value in the Increment field and S is the common Stride of all the related candidates. The Cost field represents the cost of replacing each statement having this increment with an addition relative to its basis. If the value is less than zero, the replacement is profitable. The generation of the increment table in FIG. 20 is discussed in detail below.

For each candidate to be processed, first calculate its increment. For every candidate C except the root, the increment is the difference between C's Index field and the Index field of C's basis. For example, statement 5 's basis is statement 2, and their respective indices are 7 and 5, so the increment for statement 5 is 7−5=2. For the root, we define the increment to just be the root's Index field.

There is only one root candidate in our example: Statement 2 has Basis 0 and Dependent 11. As a root statement, its increment is the same as its Index field (5). We create an entry in the increment table for increment 5. Because the root candidate will never itself be a candidate for replacement, we set the count field to 0 and the cost field to infinity. Because the root statement provides the expression 5*s, and the Increment field is 5, the left-hand side of statement 2 (a) is stored in the Initializer field.

Following statement 2's Dependent field, we next process statement 11. Statement 11's increment is 8−5=3. There is no entry in the table for increment 3, so a new entry is created with Increment=3 and Count=1. No initializer is available for 3*s. The cost field will be calculated later.

Following statement 11's Sibling field, we next process statement 5 . Statement 5's increment is 7−5=2. There is no entry in the table for increment 2, so a new entry is created with Increment=2 and Count=1. No initializer is available for 2*s.

Following statement 5 's Dependent field, we next process Statement 8. Statement 8's increment is 9−7=2. An existing entry for increment 2 is found, so its Count field is incremented to 2.

Statement 8 has no Dependent or Sibling field, so we return to statement 5 . Statement 5 has no Sibling field, so we return to statement 11. Statement 11 has no Dependent field, so we return to statement 2. Statement 2 has no Sibling field, and is the root of the tree, so the generation of the increment table from the candidate table is complete.

Next, the cost for each increment is computed. For most increments I, an initializer t=I*S will have to be inserted into the code, and then the right-hand side of each candidate other than the root will be replaced by t+b, where b is the value of the candidate's basis statement. The cost of inserting the initializer is offset by the value of any statements that can be removed when making the replacement, as stored in the candidate's Dead Savings field. Note that increments 0, 1, and −1 are cheaper to introduce, because the initializer need not be inserted. Instead, the right-hand side of each candidate is replaced by b, b+s, or b−s, respectively.

Looking at the example, we first look at the entry for increment 5. Since the count is zero, nothing is done with this increment.

For increment 3, the Count field is 1, and the single related candidate is statement 11. To replace statement 11, we must insert an initializer t=3*s, at cost C(*, 3). From the candidate table, we see that the replacement allows removal of some existing statements at a savings of C(*, 8), so the total cost is C(*, 3)−C(*, 8).

For increment 2, the Count field is 2, and the two related candidates are statements 5 and 8. To replace these, we must insert an initializer t=2*s, at cost C(*, 2). From the candidate table, we see that replacing each of these statements allows removal of some existing statements at a savings of C(*, 7) and C(*, 9), respectively. So the total cost is C(*, 2)−C(*, 7)−C(*, 9).

Up to this point, we have treated costs such as C(*, n) symbolically. For any particular target processor, we must estimate concrete values for these costs. On most modern processors, the cost of a multiply instruction is much higher than the cost of simpler instructions such as a left-shift or an addition. If the simpler instructions take a single machine cycle to execute, the multiply might take tens of machine cycles. So multiplies by a constant are usually replaced by a sequence of shifts and/or adds and subtracts.

Typical sequences for multiplying a variable x by the values used in this example are shown in the table in FIG. 21. We assume that each of these costs has a value of either 1 or 2 cycles. The cost for increment 3 is then C(*, 3)−C(*, 8)=2−1=1. Since this is positive, the replacement is not profitable. The cost for increment 2 is C(*, 2)−C(*, 7)−C(*, 9)=1−2−2=−3, so the replacement is profitable.

For each profitable increment, the next step is to insert an initializer if one is needed. An initializer is an instruction that defines a temporary variable that is inserted so the strength reduction may be performed. The only profitable increment is 2, and there is no initializer 2*s, so we must insert an initializer instruction t=2*s, where the variable t is the new temporary variable. Note that if such an initializer already existed, we would not insert a new instruction, but would instead use the variable defined by the initializer instead of a new variable t. We must find a location that dominates both candidates 5 and 8. Referring to FIG. 10, these statements are in block B and E, and B dominates E, so we can place the initializer in block B provided we insert the initializer prior to statement 5. So a statement t=2*s is inserted immediately prior to statement 5, as shown in basic block B in FIG. 22.

Figure 22:
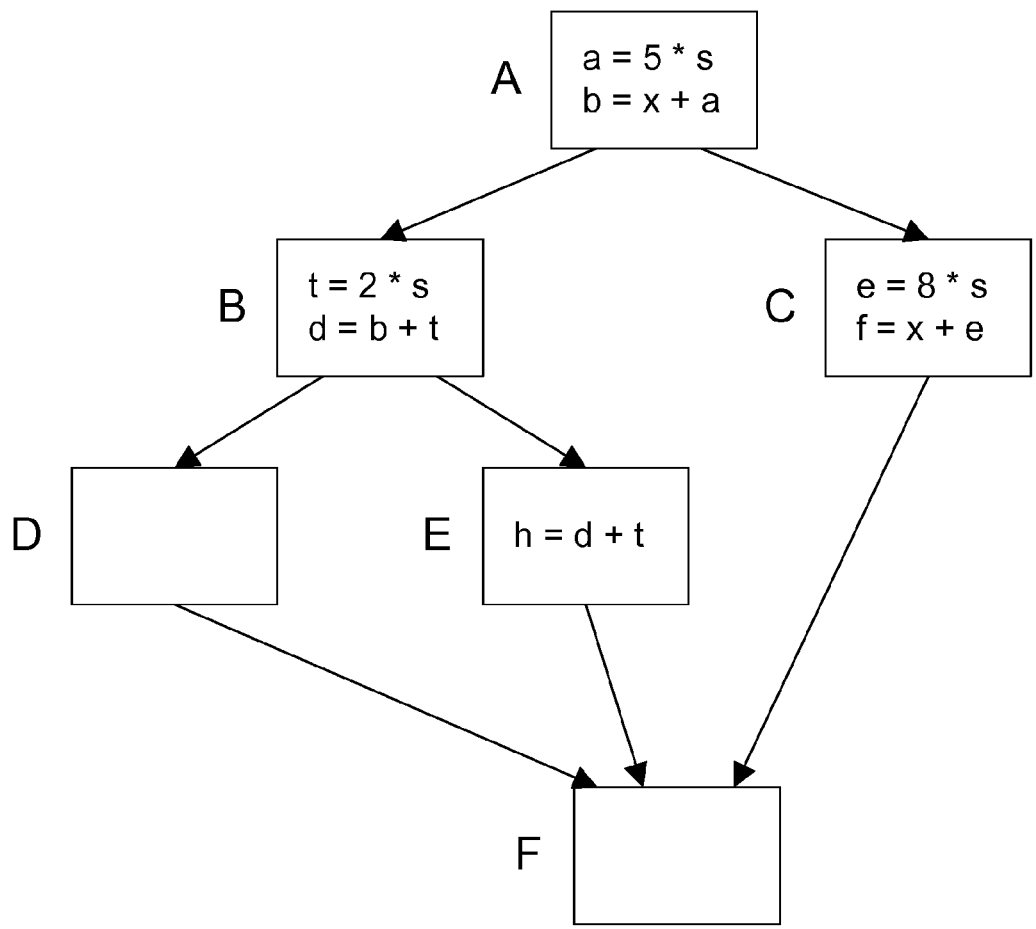
FIG. 22 is a control flow graph of the code in FIG. 8 after performing the strength reduction disclosed herein.

We can now replace statements 5 and 8 with statements that use the initializer and the respective bases. Statement 5 is replaced by d=b+t, and statement 8 is replaced by h=d+t. The results computed by statements 4 and 7 are no longer needed, so these statements are removed. In the alternative, removal of these instructions could be left to a separate "dead code elimination" pass that removes instructions whose produced values are no longer used. The resulting control flow graph is shown in FIG. 22. Because original instructions have been replaced with alternative instructions that have lower cost, the result is strength reduction in the code.

An optimizing compiler with the strength reduction mechanism discussed above can perform strength reduction for operations of unknown strides. In addition, the strength reduction mechanism can also perform strength reduction for conditional operations. A conditional operation is defined herein as one or more instructions that are executed only when specified conditions are satisfied. "If" and "case" statements are examples of conditional operations. As mentioned above, known optimizing compilers do not perform strength reduction on conditional operations.

Referring to FIG. 23, a C-code snippet is shown to illustrate how strength reduction can be profitable for conditional operations. The "if" condition in FIG. 23 would seem to make it impossible to replace the last multiple with an add, because the compiler does not know whether to add 4 or 8. For this reason, known compilers would not perform strength reduction of the code in FIG. 23. However, assuming the value of the variable i is not used after the assignment to b, the code can be changed profitably as shown in FIG. 24. The code in FIG. 23 will either execute i=i+1 or i=i+2, but not both. A multiply by 4 is usually accomplished using an instruction that shifts the multiplicand left by two bits. A shift instruction and an add instruction are typically comparable in cost. So the cost of executing the sequence in FIG. 23 is 3 adds and 2 shifts, or 5 total operations. By contrast, the cost of executing the sequence in FIG. 24 is 2 adds and one shift, or 3 total operations. This form of strength reduction is not done in known optimizing compilers due to the presence of the conditional operations.

Figure 25:
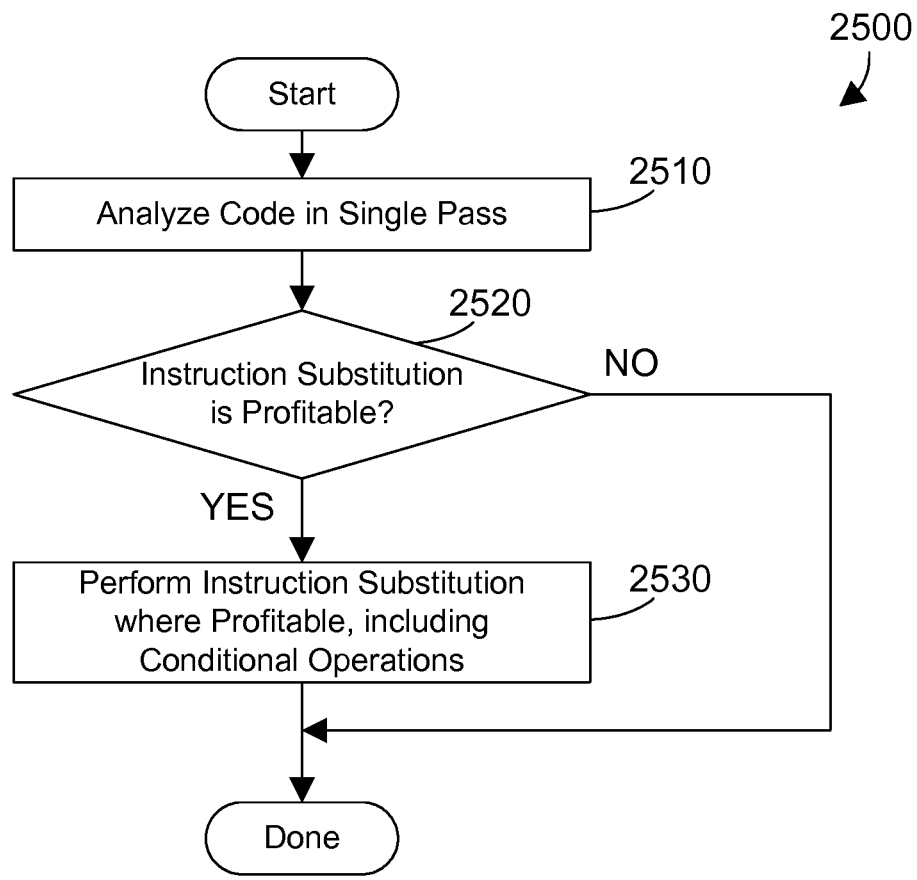
FIG. 25 is a flow diagram of a method for performing strength reduction in a single pass for conditional operations.

Referring to FIG. 25, a method 2500 performs strength reduction on conditional operations. The code is analyzed in a single pass (step 2510). When instruction substitution is profitable (step 2520=YES), instruction substitution is performed where profitable, including conditional operations (step 2530). When instruction substitution is not profitable (step 2520=NO), method 2500 is done. Method 2500 differs from the operation of known optimizing compilers by analyzing code in a single pass, and by performing instruction substitution that results in strength reduction for conditional operations.

Figure 26:
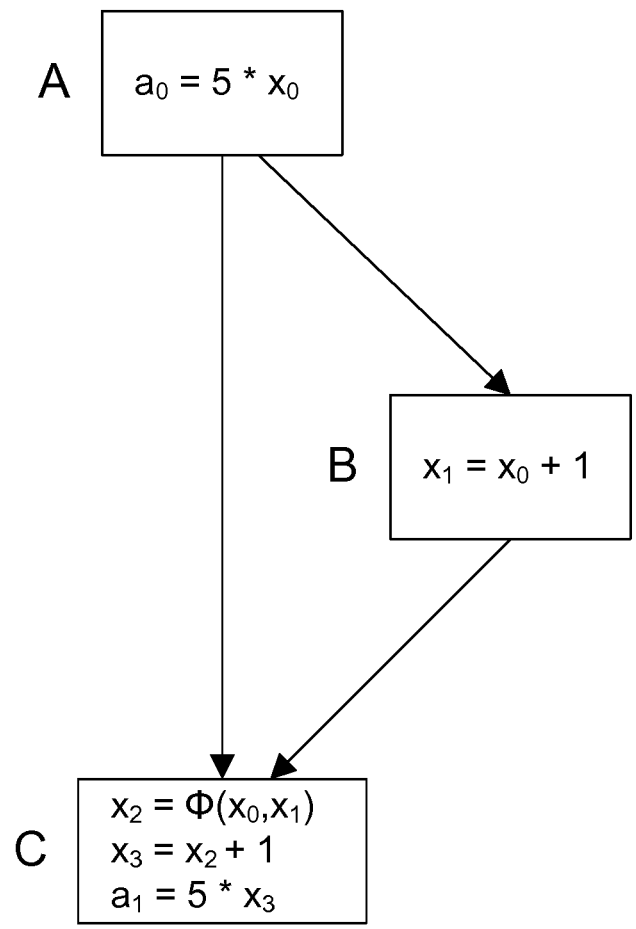
FIG. 26 is a diagram of a portion of a control flow graph of sample code.

An example is now given in FIGS. 26-32 to illustrate strength reduction for conditional operations. Referring to FIG. 26, a sample control flow graph is shown for sample code. Here again, the code in FIG. 26 is extremely simplified for illustrating the concepts herein. Most modern compilers use an intermediate representation for optimization known as Static Single Assignment (SSA) form. In SSA form, no variable in a function body is defined more than once. Translation into SSA form is well-known in the art, but in essence if a variable is defined more than once during a program, the different definitions are distinguished by subscripts, as are the uses reached by each definition. So the following code:

$x=a+b$
$y=x*4$
$x=x+1$
$y=x*4$ would become in SSA form:

$x_1=a_1+b_1$
$y_1=x_1*4$
$x_2=x_1+1$
$y_2=x_2*4$

Knowing that each variable has precisely one definition makes many optimization algorithms much simpler and more efficient. However, what happens if two definitions reach the same use, as in:

```
if (...)
    x = 2;
else
    x = 5;
y = x * 4;
```

The first instance of x becomes $x_1$, the second becomes $x_2$, but what of the third? To place the program in SSA form, that use of x must have only one definition. The answer is to introduce a "merge operator," traditionally represented with the Greek letter phi, represented here as $\Phi$. Note the discussion herein uses the $\Phi$ symbol and the word PHI interchangeably. The merge operator $\Phi$ says that we know the defined value has one of the values merged by the $\Phi$ operator, but we can't tell at compile time which one. Using this technique, the code above is written as:

```
if (...)
    x₁ = 2;
else
    x₂ = 5;
x₃ = Φ(x₁, x₂);
y₁ = x₃ * 4;
```

$\Phi$ operators are always introduced at the beginning of the basic block where the merge occurs. Methods for transforming a program into SSA form are well-known in the art, and are not discussed in detail herein. The discussion above is for the purpose of introducing the $\Phi$ operator for the discussion herein.

The code in FIG. 26 is in static single assignment (SSA) form, where each definition of x and a has been given a new subscript. At the beginning of block C, a $\Phi$ statement is introduced to merge the values of $x_0$ and $x_1$ into a single variable $x_2$. The dominator tree is simple: A dominates B and C, and no other block dominates any other. Assume that $x_0$ is an input parameter.

A reverse post-order traversal, standard in forward data-flow problems, will be used. In this case there is only one reverse post-order traversal that satisfies the dominator tree: ABC.

A candidate table is constructed by analyzing the code in FIG. 26 in the order ABC. The candidate table for the first statement, which is in block A, is shown in FIG. 27. Note the candidate table has a new column Phi to represent information relating to conditional operations. The first statement is a MULT statement as shown in FIG. 27, with B=$x_0$, i=0 and S=5. The remaining fields are all zero. The second statement, the instruction in block B, is then processed, resulting in the candidate table shown in FIG. 28. This statement can be rewritten as $x_1$=$x_0$+(1*1), so an ADD candidate is created for it with B=$x_0$, i=1, and S=1. Neither has a basis earlier in the candidate table, and none of the statements in this example have multiple interpretations.

Statement 3, the first instruction in block C, represents something new. When we encounter a PHI operator, we analyze each of the arguments ($x_0$ and $x_1$ in this case) to see if they have the same "derived base name." If the argument is defined by a candidate C that is an ADD candidate having a stride of 1, then the derived base name is the Base field of C. For example, $x_1$ is defined by statement 2, which is an ADD having a stride of 1 and a Base field of $x_0$, so the derived base name for $x_1$ is $x_0$. In all other cases, the derived base name of the argument is itself. For example, $x_0$ is not defined by any statement in the candidate table, so $x_0$ is its own derived base name.

In this case, all arguments of the PHI in statement 3 have the same derived base name $x_0$, so $x_0$ is recorded as the Base for statement 3. The Index and Stride fields are arbitrarily set to 0 and 1; their values are not used. Because statement 3 contains a PHI, it is marked as a PHI candidate in the Kind field. If not all arguments of the PHI had the same derived base name, the PHI statement would not be entered in the candidate table. If the PHI statement can be removed, the definition of $x_1$ could also be removed, so C(+) is entered into the Dead Savings field, where C(+) is the cost of an addition instruction on the target machine.

Statement 4, the second instruction in block C, is handled similarly to statement 2. Since $x_2$ is defined by a PHI, there is no rule for combining statement 3 into statement 4. However, if statement 4 can be removed, statement 3 can also be removed at a savings of C(Φ). Statement 3's Dead Savings field is accumulated as well, for a total of C(Φ)+C(+). The resulting candidate table is shown in FIG. 30.

Statement 5, the third instruction in block C, is then processed. Initially it appears that this statement has no basis, since there is no previous candidate with Base $x_2$ and Stride 5. However, we determine that statement 5 has a "hidden basis" because:

Statement 5's Base field is defined by a PHI candidate;
The PHI's derived base name is $x_0$; and
There is a previous candidate, namely statement 1, with Base $x_0$ and Stride 5.

Therefore statement 5 's Basis field is set to 1, and statement 1 's Dependent field is set to 5, as shown in bold in FIG. 31. To identify this as a hidden basis, statement 5 's Phi field is set to 3, indicating the PHI definition via which the hidden basis was found.

If statement 5 is replaced, statement 4 will no longer be needed, so statement 5's Dead Savings field is set to C(+) in addition to the Dead Savings field of statement 4, for a total of C(Φ)+2×C(+).

Once again, the candidate table is scanned looking for trees of related candidates. The only root candidate is statement 1, and it has a single dependent candidate in its tree, namely statement 5. Since the common stride is a constant, there is no need to build an increment table as discussed above and shown in FIG. 20.

The profitability of replacing statement 5 is now considered. Replacing it with an addition will save C(*, 5) units at the cost of C(+) units. There will also be additional dead-code savings of C(Φ)+2×C(+) units for removing statements 2, 3, and 4. As we will see, we will have to introduce an addition statement in block B at cost C(+), and a PHI statement in block C at a cost of C(Φ). So the total cost of replacing statement 5 is:

$$C(+)-C(*,5)-C(\Phi)-2\times C(+)+C(+)+C(\Phi)=-C(*,5)$$

Using the calculation of cost outlined above, C(*, 5)=2 cycles, so the total cost is −2 cycles. Because the net cost is negative, the replacement is profitable.

The first step in replacing statement 5 is to introduce a new PHI statement following the statement identified in its Phi field, i.e., statement 3. The statement will be of the form t=Φ($u_0$, $u_1$), where $u_0$ and $u_1$ are yet to be determined.

Recall that the derived base name for statement 3 is $x_0$. The first argument of statement 3 is also $x_0$. When this is the case, we set the corresponding argument of the new PHI statement to be the value produced by the hidden basis, which in this case is $a_0$ from statement 1 . So the partially constructed PHI statement is now t=Φ($a_0$, $u_1$).

The second argument of statement 3 is $x_1$, which is not the derived base name for statement 3. In this case, we must introduce an addition of the form $u_1$=$a_0$+(i−i')*S along the incoming arc corresponding to the second argument, which in this case is block B. Here i is the index of statement 2 which defined $x_1$; i' is the index of statement 1, which is the hidden basis; and S is the common stride. Since i=1, i'=0, and S=5, the introduced statement is $u_1$=$a_0$+5. $u_1$ is then used as the value of the second argument in the new PHI statement, which is now complete.

Now statement 5 can itself be replaced by the statement $a_1$=t+(i*S), where i is statement 5 's index field and S is the common stride. Since i=1 and S=5, the result is $a_1$=t+5.

Figure 32:
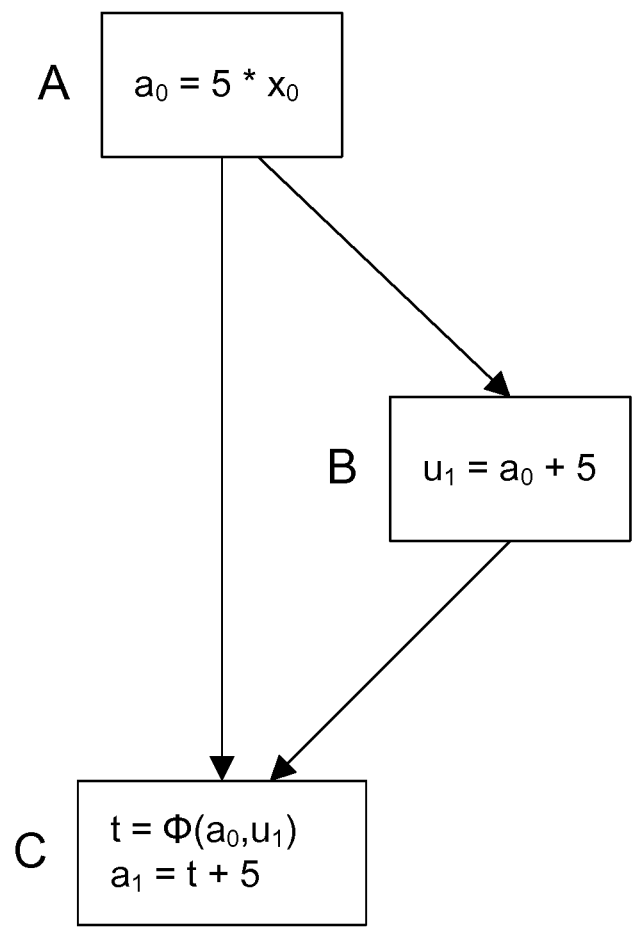
FIG. 32 is a block diagram of the control flow graph for the sample code in FIG. 26 after performing strength reduction on the conditional operations.

The dead statements 2, 3, and 4 are then removed, resulting in the control flow graph in FIG. 32. It is easy to verify that this code in FIG. 32 calculates the same result as the code in FIG. 26.

For simplicity, the example above for conditional code has the stride as a known constant, instead of a variable. If the stride is a variable, then the techniques involving increments from the previous example discussed above with reference to FIGS. 10-22 will be needed as well.

The example above does not explain what C(Φ) is. Eventually a program in SSA form has to be converted out of SSA form, since PHI instructions don't have corresponding hardware instructions. Typically what's left behind is at most a register copy along each incoming path to the join point, and usually the register copies can be removed by the compiler. Even if they're left behind, modern processors can usually hide the cost of the copy. So for the example above, C(Φ) is estimated to be zero.

The claims and disclosure herein provide an optimizing compiler that includes a strength reduction mechanism that optimizes a computer program that includes conditional operations by analyzing the instructions in the computer program in a single pass, determining whether instruction substitution is profitable for original instructions in the code, and performing instruction substitution for one or more original instructions for which instruction substitution is deemed profitable, including conditional operations. The substituted instructions result in strength reduction in the computer program.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for processing a plurality of instructions in a computer program, the method comprising the steps of:
   generating a control flow graph of the plurality of instructions in the computer program;
   generating a dominator tree corresponding to the control flow graph that indicates which blocks in the control flow graph dominate other blocks in the control flow graph;
   generating a candidate table of instructions in an order determined by the dominator tree, wherein for each instruction the candidate table comprises a base value and an index value;
   determining when a root candidate exists in the candidate table of instructions, wherein a root candidate is a candidate instruction that has no basis instruction and has at least one dependent, wherein a basis instruction is another candidate instruction in the candidate table of instructions which has the same base value;
   when a root candidate exists in the candidate table of instructions, selecting the root candidate in the candidate table of instructions;
   generating an increment table having a plurality of increments by processing the root candidate and related candidates in the candidate table of instructions, wherein a candidate's increment is the difference between its index and the index of its basis instruction;
   computing cost of each increment in the increment table;
   selecting an increment in the increment table;
   determining when the selected increment is profitable based on the computed cost;
   when the selected increment is profitable based on the computed cost:
      inserting an initializer for a temporary variable;
      substituting at least one alternative instruction that references the temporary variable for original instructions in the computer program; and
      removing instructions in the computer program that are unneeded due to the substituting in the preceding step.

* * * * *